United States Patent
Liu et al.

(10) Patent No.: US 11,277,406 B2
(45) Date of Patent: Mar. 15, 2022

(54) MTS-BASED MUTUAL-AUTHENTICATED REMOTE ATTESTATION

(71) Applicant: Intel Corporation, Santa Clara, CA (US)

(72) Inventors: Xiruo Liu, Portland, OR (US); Rafael Misoczki, Hillsboro, AZ (US); Santosh Ghosh, Hillsboro, OR (US); Manoj Sastry, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 145 days.

(21) Appl. No.: 16/455,862

(22) Filed: Jun. 28, 2019

(65) Prior Publication Data

US 2019/0364042 A1 Nov. 28, 2019

(51) Int. Cl.
| | |
|---|---|
| *H04L 29/06* | (2006.01) |
| *H04L 9/32* | (2006.01) |
| *H04L 9/08* | (2006.01) |

(52) U.S. Cl.
CPC ........ *H04L 63/0869* (2013.01); *H04L 9/0852* (2013.01); *H04L 9/3242* (2013.01); *H04L 9/3265* (2013.01)

(58) Field of Classification Search
None
See application file for complete search history.

(56) References Cited

U.S. PATENT DOCUMENTS

| | | | | |
|---|---|---|---|---|
| 2010/0293373 | A1* | 11/2010 | McBrearty | G06F 21/577 713/168 |
| 2012/0023328 | A1* | 1/2012 | Xiao | H04L 9/3239 713/156 |

(Continued)

FOREIGN PATENT DOCUMENTS

| | | |
|---|---|---|
| CN | 112152792 A | 12/2020 |
| EP | 3758280 | 12/2020 |

OTHER PUBLICATIONS

Communication Extended European Search Report for EP Application No. 20161602.6 dated Sep. 17, 2020, 10 pages.

(Continued)

*Primary Examiner* — William J. Goodchild
(74) *Attorney, Agent, or Firm* — Jaffery Watson Mendonsa & Hamitlon LLP

(57) ABSTRACT

In one example a prover device comprises one or more processors, a computer-readable memory, and signature logic to store a first cryptographic representation of a first trust relationship between the prover device and a verifier device, the first cryptographic representation based on a pair of asymmetric hash-based multi-time signature keys, receive an attestation request message from the verifier device, the attestation request message comprising attestation data for the verifier device and a hash-based signature generated by the verifier device, and in response to the attestation request message, to verify the attestation data, verify the hash-based signature generated by the verifier device using a public key associated with the verifier device, generate an attestation reply message using a hash-based multi-time private signature key and send the attestation reply message to the verifier device. Other examples may be described.

24 Claims, 11 Drawing Sheets

A private key can sign a multiple messages

(56) References Cited

U.S. PATENT DOCUMENTS

| | | | |
|---|---|---|---|
| 2012/0060039 A1* | 3/2012 | Leclercq | H04L 9/3265 |
| | | | 713/189 |
| 2012/0198237 A1* | 8/2012 | Balinsky | H04L 9/3234 |
| | | | 713/176 |
| 2012/0284518 A1* | 11/2012 | Walker | H04L 9/3255 |
| | | | 713/171 |
| 2014/0095886 A1* | 4/2014 | Futral | G06F 21/72 |
| | | | 713/187 |
| 2015/0264021 A1* | 9/2015 | Schulz | H04L 63/0414 |
| | | | 713/170 |
| 2018/0013569 A1 | 1/2018 | Knopf | |
| 2018/0088927 A1* | 3/2018 | Zhao | H04L 9/0643 |
| 2018/0183603 A1 | 6/2018 | Liu et al. | |

OTHER PUBLICATIONS

Huelsing, A., et al., "XMSS: Extended Hash-Based Signatures-12", Internet Draft, Crypto Forum Research Group, Internet Engineering Task Force, IETF; StandardWorkingDraft, Internet Society (ISOC) 4, Rue Des Falaises Ch-1205-GE, No. 12,Jan. 1, 2018, pp. 1-72, XP015125115.

\* cited by examiner

One-Time Hash-Based Signatures

A private key must only sign a single message

Multi-Time Hash-Based Signatures

A private key can sign a multiple messages

WOTS One-Time Signature Scheme

Message is hashed and parsed into M:67 integers between [0,1,2,...15]

205 — Public Key pk: 67 components of 32-bytes each

210 — Signature s: 67 components of 32-bytes each

215 — Public Key pk: 67 components of 32-bytes each

MTS-BASED MUTUAL-AUTHENTICATED REMOTE ATTESTATION

BACKGROUND

Subject matter described herein relates generally to the field of computer security and more particularly to multi-time signature (MTS)-based mutual authenticate remote attestation.

Existing public-key digital signature algorithms such as Rivest-Shamir-Adleman (RSA) and Elliptic Curve Digital Signature Algorithm (ECDSA) are anticipated not to be secure against brute-force attacks based on algorithms such as Shor's algorithm using quantum computers. As a result, there are efforts underway in the cryptography research community and in various standards bodies to define new standards for algorithms that are secure against quantum computers.

Accordingly, techniques to accelerate post-quantum signature schemes such may find utility, e.g., in computer-based communication systems and methods.

BRIEF DESCRIPTION OF THE DRAWINGS

The detailed description is described with reference to the accompanying figures.

DETAILED DESCRIPTION

Figure 1A:
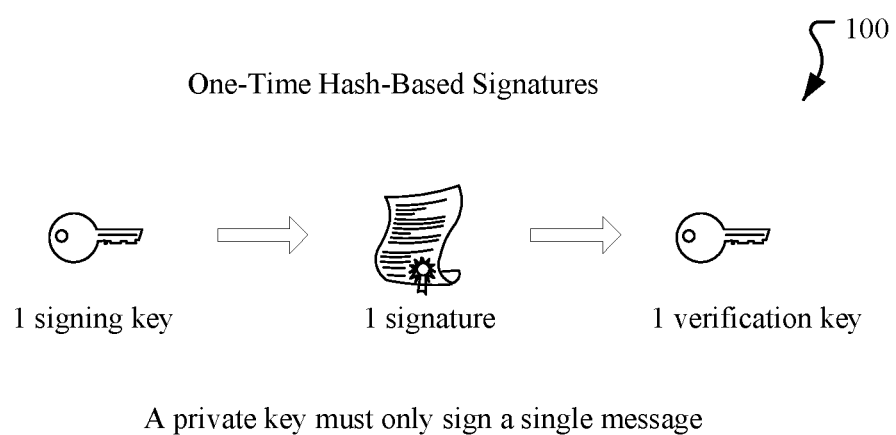
FIGS. 1A and 1B are schematic illustrations of a one-time hash-based signatures scheme and a multi-time hash-based signatures scheme, respectively.

Described herein are exemplary systems and methods to implement multi-time signature (MTS)-based mutual authenticated remote attestation. In the following description, numerous specific details are set forth to provide a thorough understanding of various examples. However, it will be understood by those skilled in the art that the various examples may be practiced without the specific details. In other instances, well-known methods, procedures, components, and circuits have not been illustrated or described in detail so as not to obscure the examples.

As described briefly above, existing public-key digital signature algorithms such as Rivest-Shamir-Adleman (RSA) and Elliptic Curve Digital Signature Algorithm (ECDSA) are anticipated not to be secure against brute-force attacks based on algorithms such as Shor's algorithm using quantum computers. The eXtended Merkle signature scheme (XMSS) and/or an eXtended Merkle multi-tree signature scheme (XMSS-MT) are hash-based signature schemes that can protect against attacks by quantum computers. As used herein, the term XMSS shall refer to both the XMSS scheme and the XMSS-MT scheme.

An XMSS signature process implements a hash-based signature scheme using a one-time signature scheme such as a Winternitz one-time signature (WOTS) or a derivative there of (e.g., WOTS+) in combination with a secure hash algorithm (SHA) such as SHA2-256 as the primary underlying hash function. In some examples the XMSS signature/verification scheme may also use one or more of SHA2-512, SHA3-SHAKE-256 or SHA3-SHAKE-512 as secure hash functions. XMSS-specific hash functions include a Pseudo-Random Function (PRF), a chain hash (F), a tree hash (H) and message hash function ($H_{msg}$). As used herein, the term WOTS shall refer to the WOTS signature scheme and or a derivative scheme such as WOTS+.

The Leighton/Micali signature (LMS) scheme is another hash-based signature scheme that uses Leighton/Micali one-time signatures (LM-OTS) as the one-time signature building block. LMS signatures are based on a SHA2-256 hash function.

An XMSS signature process comprises three major operations. The first major operation receives an input message (M) and a private key (sk) and utilizes a one-time signature algorithm (e.g., WOTS+) to generate a message representative (M') that encodes a public key (pk). In a 128-bit post quantum security implementation the input message M is subjected to a hash function and then divided into 67 message components (n bytes each), each of which are subjected to a hash chain function to generate the corresponding 67 components of the digital signature. Each chain function invokes a series of underlying secure hash algorithms (SHA).

The second major operation is an L-Tree computation, which combines WOTS+(or WOTS) public key components (n-bytes each) and produces a single n-byte value. For example, in the 128-bit post-quantum security there are 67 public key components, each of which invokes an underlying secure hash algorithm (SHA) that is performed on an input block.

The third major operation is a tree-hash operation, which constructs a Merkle tree. In an XMSS verification, an authentication path that is provided as part of the signature and the output of L-tree operation is processed by a tree-hash operation to generate the root node of the Merkle tree, which should correspond to the XMSS public key. For XMSS verification with 128-bit post-quantum security, traversing the Merkle tree comprises executing secure hash operations. In an XMSS verification, the output of the Tree-hash operation is compared with the known public key. If they match, then the signature is accepted. By contrast, if they do not match then the signature is rejected.

The XMSS signature process is computationally expensive. An XMSS signature process invokes hundreds, or even thousands, of cycles of hash computations. Subject matter described herein addresses these and other issues by providing systems and methods to implement accelerators for post-quantum cryptography secure XMSS and LMS hash-based signing and verification.

Post-Quantum Cryptography Overview

Post-Quantum Cryptography (also referred to as "quantum-proof", "quantum-safe", "quantum-resistant", or simply "PQC") takes a futuristic and realistic approach to cryptography. It prepares those responsible for cryptography as well as end-users to know the cryptography is outdated; rather, it needs to evolve to be able to successfully address the evolving computing devices into quantum computing and post-quantum computing.

It is well-understood that cryptography allows for protection of data that is communicated online between individuals and entities and stored using various networks. This communication of data can range from sending and receiving of emails, purchasing of goods or services online, accessing banking or other personal information using websites, etc.

Conventional cryptography and its typical factoring and calculating of difficult mathematical scenarios may not matter when dealing with quantum computing. These mathematical problems, such as discrete logarithm, integer factorization, and elliptic-curve discrete logarithm, etc., are not capable of withstanding an attack from a powerful quantum computer. Although any post-quantum cryptography could be built on the current cryptography, the novel approach would need to be intelligent, fast, and precise enough to resist and defeat any attacks by quantum computers Today's PQC is mostly focused on the following approaches: 1) hash-based cryptography based on Merkle's hash tree public-key signature system of 1979, which is built upon a one-message-signature idea of Lamport and Diffie; 2) code-based cryptography, such as McEliece's hidden-Goppa-code public-key encryption system; 3) lattice-based cryptography based on Hoffstein-Pipher-Silverman public-key-encryption system of 1998; 4) multivariate-quadratic equations cryptography based on Patarin's HFE public-key-signature system of 1996 that is further based on the Matumoto-Imai proposal; 5) supersingular elliptical curve isogeny cryptography that relies on supersingular elliptic curves and supersingular isogeny graphs; and 6) symmetric key quantum resistance, including hash-based signature schemes.

Figure 1B:
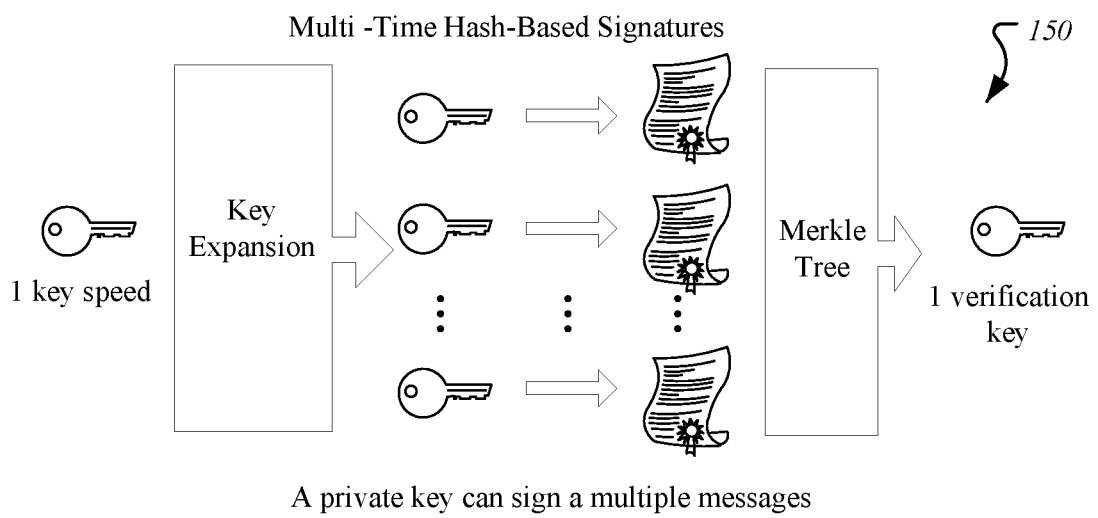

FIGS. 1A and 1B illustrate a one-time hash-based signatures scheme and a multi-time hash-based signatures scheme, respectively. As aforesaid, hash-based cryptography is based on cryptographic systems like Lamport signatures, Merkle Signatures, extended Merkle signature scheme (XMSS), and SPHINCs scheme, etc. With the advent of quantum computing and in anticipation of its growth, there have been concerns about various challenges that quantum computing could pose and what could be done to counter such challenges using the area of cryptography.

One area that is being explored to counter quantum computing challenges is hash-based signatures (HBS) since these schemes have been around for a long while and possess the necessarily basic ingredients to counter the quantum counting and post-quantum computing challenges. HBS schemes are regarded as fast signature algorithms working with fast platform secured-boot, which is regarded as the most resistant to quantum and post-quantum computing attacks.

For example, as illustrated with respect to FIG. 1A, a scheme of HBS is shown that uses Merkle trees along with a one-time signature (OTS) scheme 100, such as using a private key to sign a message and a corresponding public key to verify the OTS message, where a private key only signs a single message.

Similarly, as illustrated with respect to FIG. 1B, another HBS scheme is shown, where this one relates to multi-time signatures (MTS) scheme 150, where a private key can sign multiple messages.

Figure 2A:
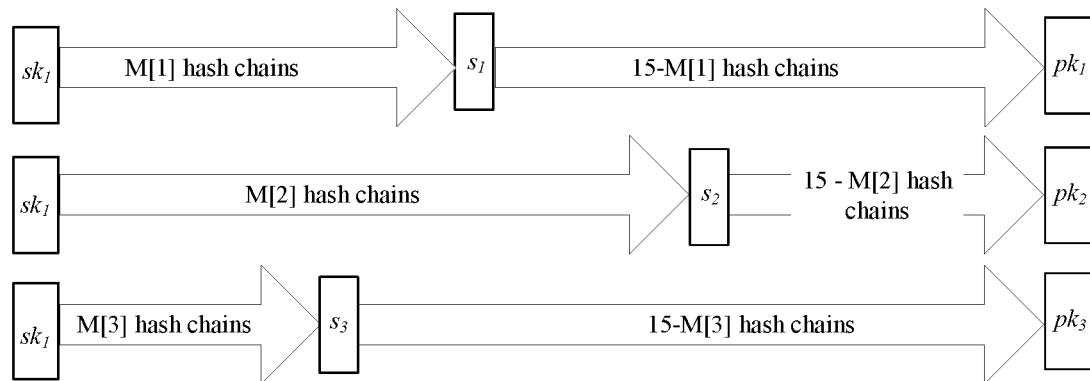
FIGS. 2A-2B are schematic illustrations of a one-time signature scheme and a multi-time signature scheme, respectively.
Figure 2A:
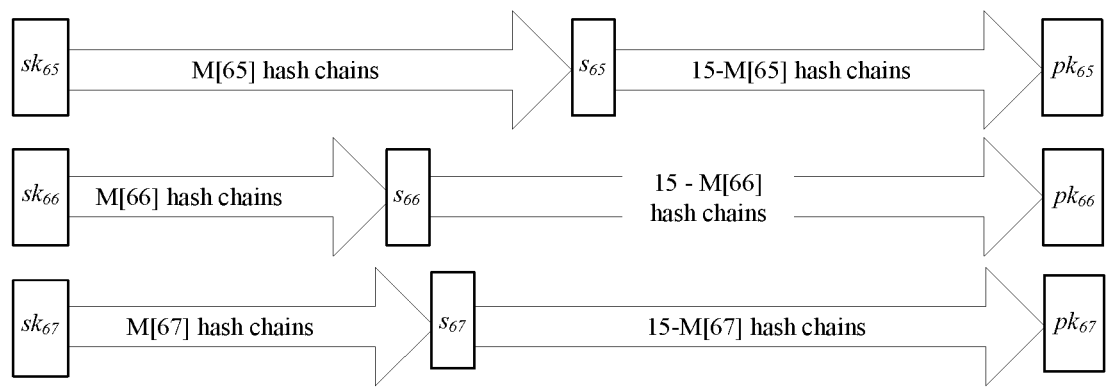
Figure 2B:
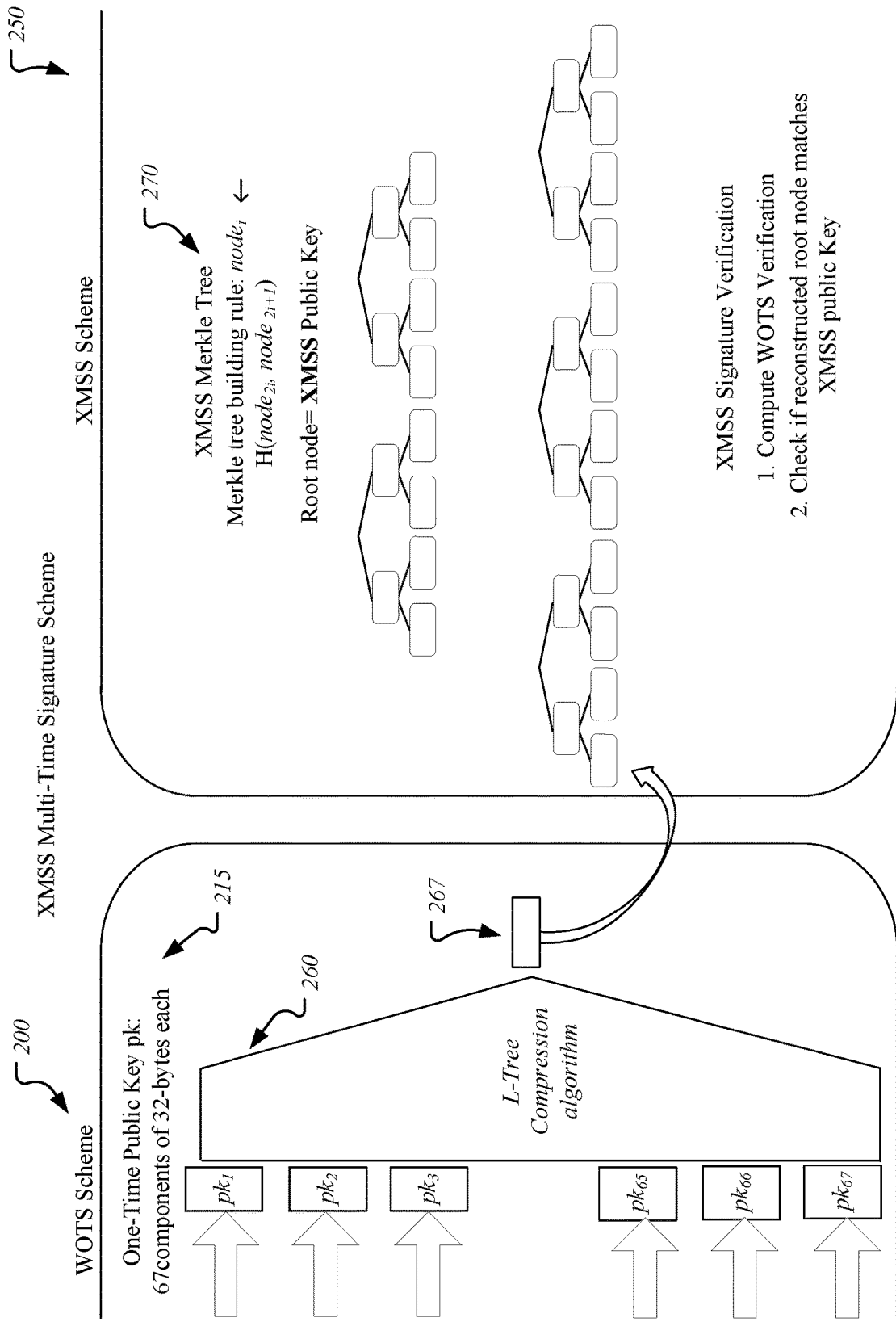

FIGS. 2A and 2B illustrate a one-time signature scheme and a multi-time signature scheme, respectively. Continuing with HBS-based OTS scheme 100 of FIG. 1A and MTS scheme 150 of FIG. 1B, FIG. 2A illustrates Winternitz OTS scheme 200, which was offered by Robert Winternitz of Stanford Mathematics Department publishing as hw(x) as opposed to h(x)|h(y), while FIG. 2B illustrates XMSS MTS scheme 250, respectively.

For example, WOTS scheme 200 of FIG. 2A provides for hashing and parsing of messages into M, with 67 integers between [0, 1, 2, . . . , 15], such as private key, sk, 205, signature, s, 210, and public key, pk, 215, with each having 67 components of 32 bytes each.

FIG. 2B illustrates XMSS MTS scheme 250 that allows for a combination of WOTS scheme 200 of FIG. 2A and XMSS scheme 255 having XMSS Merkle tree. As discussed previously with respect to FIG. 2A, WOTs scheme 200 is based on a one-time public key, pk, 215, having 67 components of 32 bytes each, that is then put through L-Tree compression algorithm 260 to offer WOTS compressed pk 265 to take a place in the XMSS Merkle tree of XMSS scheme 255. It is contemplated that XMSS signature verification may include computing WOTS verification and checking to determine whether a reconstructed root node matches the XMSS public key, such as root node=XMSS public key.

Post-Quantum Cryptography Algorithms

Figure 3:
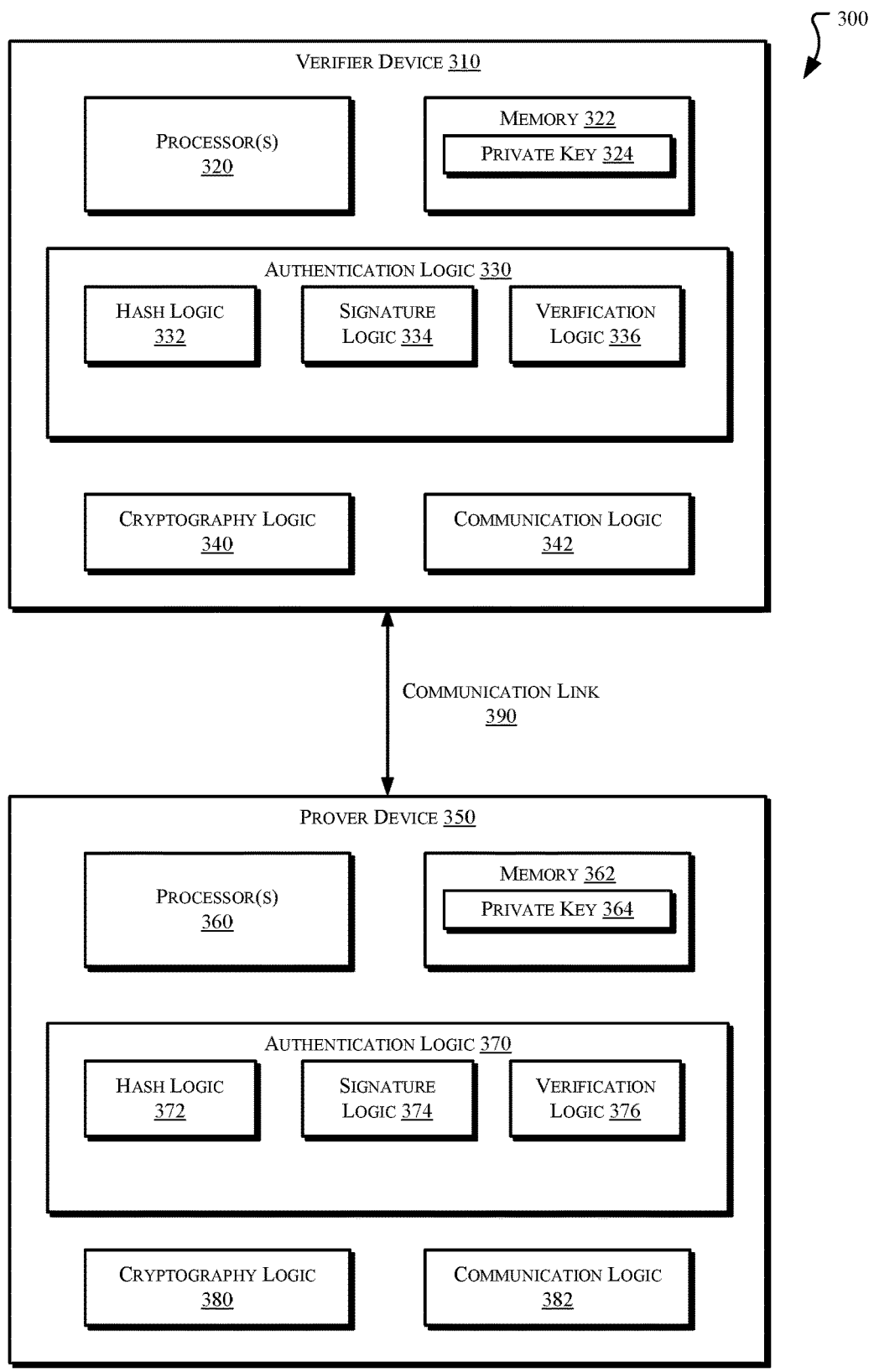
FIG. 3 is a schematic illustration of a signing device and a verifying device, in accordance with some examples.

FIG. 3 is a schematic illustration of a high-level architecture of a secure environment 300 that includes a first device 310 and a second device 350, in accordance with some examples. Referring to FIG. 3, each of the first device 310 and the second device 350 may be embodied as any type of computing device capable of performing the functions described herein. For example, in some embodiments, each of the first device 310 and the second device 350 may be embodied as a laptop computer, tablet computer, notebook, netbook, Ultrabook™, a smartphone, cellular phone, wearable computing device, personal digital assistant, mobile Internet device, desktop computer, router, server, workstation, and/or any other computing/communication device.

First device 310 includes one or more processor(s) 320 and a memory 322 to store a private key 324. The processor(s) 320 may be embodied as any type of processor capable of performing the functions described herein. For example, the processor(s) 320 may be embodied as a single or multi-core processor(s), digital signal processor, microcontroller, or other processor or processing/controlling circuit. Similarly, the memory 322 may be embodied as any type of volatile or non-volatile memory or data storage capable of performing the functions described herein. In operation, the memory 322 may store various data and software used during operation of the first device 310 such as operating systems, applications, programs, libraries, and drivers. The memory 322 is communicatively coupled to the processor(s) 320. In some examples the private key 324 may reside in a secure memory that may be part memory 322 or may be separate from memory 322.

First device 310 further comprises authentication logic 330 which includes memory 332, signature logic, and verification logic 336. Hash logic 332 is configured to hash (i.e., to apply a hash function to) a message (M) to generate a hash value (m') of the message M. Hash functions may include, but are not limited to, a secure hash function, e.g., secure hash algorithms SHA2-256 and/or SHA3-256, etc. SHA2-256 may comply and/or be compatible with Federal Information Processing Standards (FIPS) Publication 180-4, titled: "Secure Hash Standard (SHS)", published by National Institute of Standards and Technology (NIST) in March 2012, and/or later and/or related versions of this standard. SHA3-256 may comply and/or be compatible with FIPS Publication 202, titled: "SHA-3 Standard: Permutation-Based Hash and Extendable-Output Functions", published by NIST in August 2015, and/or later and/or related versions of this standard.

Signature logic 332 may be configured to generate a signature to be transmitted, i.e., a transmitted signature. In instances in which the first device 310 is the signing device, the transmitted signature may include a number, L, of transmitted signature elements with each transmitted signature element corresponding to a respective message element. For example, for each message element, $m_i$, signature logic 332 may be configured to perform a selected signature operation on each private key element, $sk_i$ of the private key, sk, a respective number of times related to a value of each message element, $m_i$ included in the message representative m'. For example, signature logic 332 may be configured to apply a selected hash function to a corresponding private key element, $sk_i$, $m_i$ times. In another example, signature logic 332 may be configured to apply a selected chain function (that contains a hash function) to a corresponding private key element, $sk_i$, $m_i$ times. The selected signature operations may, thus, correspond to a selected hash-based signature scheme.

As described above, hash-based signature schemes may include, but are not limited to, a Winternitz (W) one time signature (OTS) scheme, an enhanced Winternitz OTS scheme (e.g., WOTS+), a Merkle many time signature scheme, an extended Merkle signature scheme (XMSS) and/or an extended Merkle multiple tree signature scheme (XMSS-MT), etc. Hash functions may include, but are not limited to SHA2-256 and/or SHA3-256, etc. For example, XMSS and/or XMSS-MT may comply or be compatible with one or more Internet Engineering Task Force (IETF®) informational draft Internet notes, e.g., "XMSS: Extended Hash-Based Signatures, released May, 2018, by the Internet Research Task Force (IRTF), Crypto Forum Research Group which may be found at https://tools.ietf.org/html/rfc8391.

A WOTS signature algorithm may be used to generate a signature and to verify a received signature utilizing a hash function. WOTS is further configured to use the private key and, thus, each private key element, $sk_i$, one time. For example, WOTS may be configured to apply a hash function to each private key element, $m_i$ or $N-m_i$ times to generate a signature and to apply the hash function to each received message element $N-m_i$, or $m_i$ times to generate a corresponding verification signature element. The Merkle many time signature scheme is a hash-based signature scheme that utilizes an OTS and may use a public key more than one time. For example, the Merkle signature scheme may utilize Winternitz OTS as the one-time signature scheme. WOTS+ is configured to utilize a family of hash functions and a chain function.

XMSS, WOTS+ and XMSS-MT are examples of hash-based signature schemes that utilize chain functions. Each chain function is configured to encapsulate a number of calls to a hash function and may further perform additional operations. In some examples, the number of calls to the hash function included in the chain function may be fixed. Chain functions may improve security of an associated hash-based signature scheme.

Cryptography logic 340 is configured to perform various cryptographic and/or security functions on behalf of the signing device 310. In some embodiments, the cryptography logic 340 may be embodied as a cryptographic engine, an independent security co-processor of the signing device 310, a cryptographic accelerator incorporated into the processor(s) 320, or a standalone software/firmware. In some embodiments, the cryptography logic 340 may generate and/or utilize various cryptographic keys (e.g., symmetric/asymmetric cryptographic keys) to facilitate encryption, decryption, signing, and/or signature verification. Additionally, in some embodiments, the cryptography logic 340 may facilitate to establish a secure connection with remote devices over communication link. It should further be appreciated that, in some embodiments, the cryptography module 340 and/or another module of the first device 310 may establish a trusted execution environment or secure enclave within which a portion of the data described herein may be stored and/or a number of the functions described herein may be performed.

After the signature is generated as described above, the message, M, and signature may then be sent by first device 310, e.g., via communication logic 342, to second device 350 via network communication link 390. In an embodiment, the message, M, may not be encrypted prior to transmission. In another embodiment, the message, M, may be encrypted prior to transmission. For example, the message, M, may be encrypted by cryptography logic 340 to produce an encrypted message.

Second device 350 may also include one or more processors 360 and a memory 362 to store a private key 364. As described above, the processor(s) 360 may be embodied as any type of processor capable of performing the functions described herein. For example, the processor(s) 360 may be embodied as a single or multi-core processor(s), digital signal processor, microcontroller, or other processor or processing/controlling circuit. Similarly, the memory 362 may be embodied as any type of volatile or non-volatile memory or data storage capable of performing the functions described herein. In operation, the memory 362 may store various data and software used during operation of the second device 350 such as operating systems, applications, programs, libraries, and drivers. The memory 362 is communicatively coupled to the processor(s) 360. In some examples the private key 364 may reside in a secure memory that may be part memory 362 or may be separate from memory 362.

Second device 350 further comprises authentication logic 370 which includes hash logic 372, signature logic, and verification logic 376. As described above, hash logic 372 is configured to hash (i.e., to apply a hash function to) a message (M) to generate a hash message (m'). Hash functions may include, but are not limited to, a secure hash function, e.g., secure hash algorithms SHA2-256 and/or SHA3-256, etc. SHA2-256 may comply and/or be compatible with Federal Information Processing Standards (FIPS) Publication 180-4, titled: "Secure Hash Standard (SHS)", published by National Institute of Standards and Technology (NIST) in March 2012, and/or later and/or related versions of this standard. SHA3-256 may comply and/or be compatible with FIPS Publication 202, titled: "SHA-3 Standard: Permutation-Based Hash and Extendable-Output Functions", published by NIST in August 2015, and/or later and/or related versions of this standard.

In instances in which the second device is the verifying device, authentication logic 370 is configured to generate a verification signature based, at least in part, on the signature received from the first device and based, at least in part, on the received message representative (m'). For example, authentication logic 370 may configured to perform the same signature operations, i.e., apply the same hash function or chain function as applied by hash logic 332 of authentication logic 330, to each received message element a number, N-$m_{i'}$ (or $m_{i'}$), times to yield a verification message element. Whether a verification signature, i.e., each of the L verification message elements, corresponds to a corresponding public key element, $pk_i$, may then be determined. For example, verification logic 370 may be configured to compare each verification message element to the corresponding public key element, $pk_i$. If each of the verification message element matches the corresponding public key element, $pk_i$, then the verification corresponds to success. In other words, if all of the verification message elements match the public key elements, $pk_i, \ldots, pk_L$, then the verification corresponds to success. If any verification message element does not match the corresponding public key element, $pk_i$, then the verification corresponds to failure.

The various modules of the environment 300 may be embodied as hardware, software, firmware, or a combination thereof. For example, the various modules, logic, and other components of the environment 300 may form a portion of, or otherwise be established by, the processor(s) 320 of first device 310 or processor(s) 360 of second device 350, or other hardware components of the devices As such, in some embodiments, one or more of the modules of the environment 300 may be embodied as circuitry or collection of electrical devices (e.g., an authentication circuitry, a cryptography circuitry, a communication circuitry, a signature circuitry, and/or a verification circuitry). Additionally, in some embodiments, one or more of the illustrative modules may form a portion of another module and/or one or more of the illustrative modules may be independent of one another.

Figure 4A:
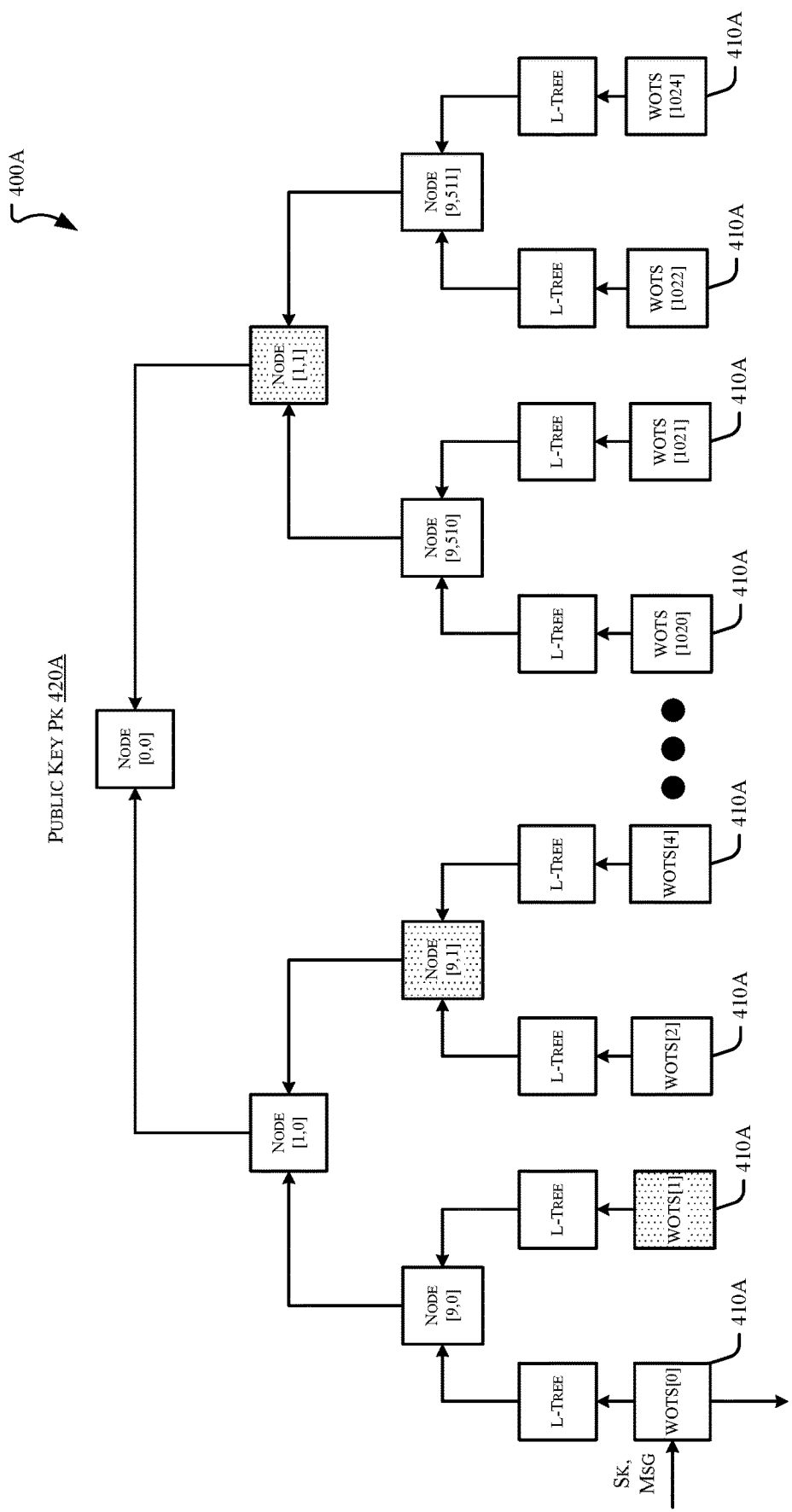
FIG. 4A is a schematic illustration of a Merkle tree structure, in accordance with some examples.

FIG. 4A is a schematic illustration of a Merkle tree structure illustrating signing operations, in accordance with some examples. Referring to FIG. 4A, an XMSS signing operation requires the construction of a Merkle tree 400A using the local public key from each leaf WOTS node 410 to generate a global public key (PK) 420. In some examples the authentication path and the root node value can be computed off-line such that these operations do not limit performance. Each WOTS node 410 has a unique secret key, "sk" which is used to sign a message only once. The XMSS signature consists of a signature generated for the input message and an authentication path of intermediate tree nodes to construct the root of the Merkle tree.

Figure 4B:
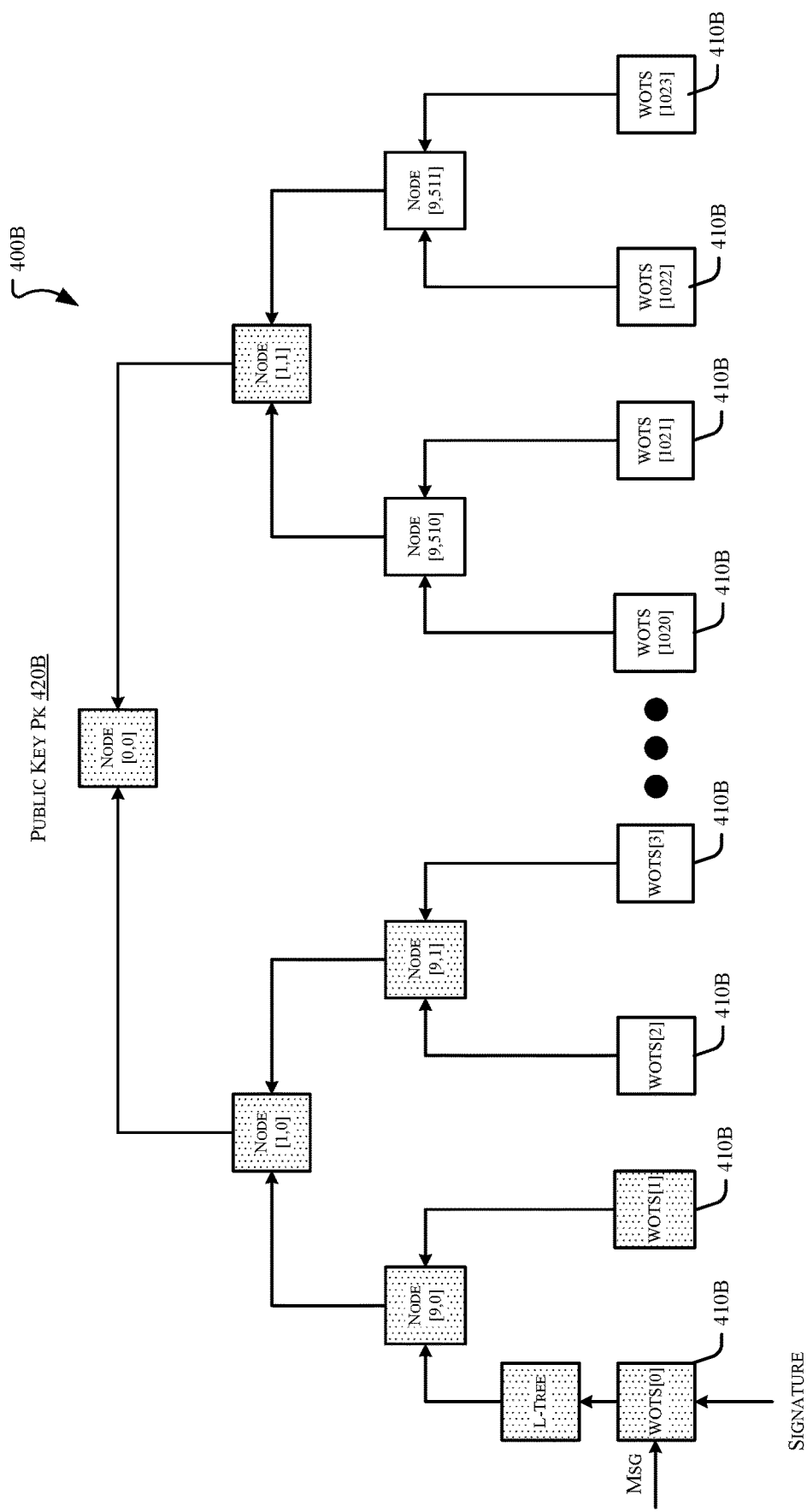
FIG. 4B is a schematic illustration of a Merkle tree structure, in accordance with some examples.

FIG. 4B is a schematic illustration of a Merkle tree structure 400B during verification, in accordance with some examples. During verification, the input message and signature are used to compute the local public key 420B of the WOTS node, which is further used to compute the tree root value using the authentication path. A successful verification will match the computed tree root value to the public key PK shared by the signing entity. The WOTS and L-Tree operations constitute a significant portion of XMSS sign/verify latency respectively, thus defining the overall performance of the authentication system. Described herein are various pre-computation techniques which may be implemented to speed-up WOTS and L-Tree operations, thereby improving XMSS performance. The techniques are applicable to the other hash options and scale well for both software and hardware implementations.

Figure 5:
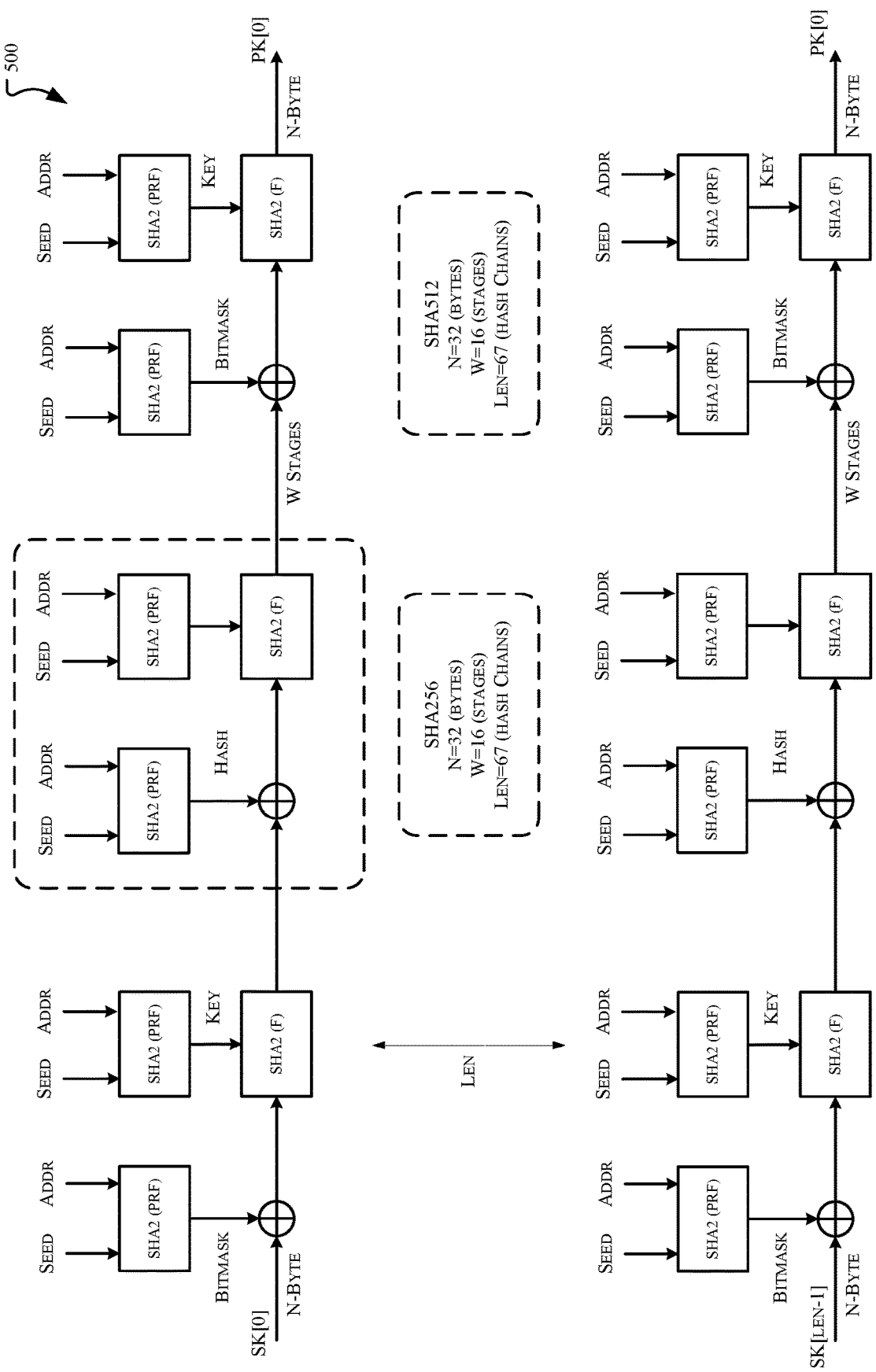
FIG. 5 is a schematic illustration of a compute blocks in an architecture to implement a signature algorithm, in accordance with some examples.

FIG. 5 is a schematic illustration of a compute blocks in an architecture 500 to implement a signature algorithm, in accordance with some examples. Referring to FIG. 5, the WOTS+ operation involves 67 parallel chains of 16 SHA2-256 HASH functions, each with the secret key sk[66:0] as input. Each HASH operation in the chain consists of 2 pseudo-random functions (PRF) using SHA2-256 to generate a bitmask and a key. The bitmask is XOR-ed with the previous hash and concatenated with the key as input message to a 3rd SHA2-256 hash operation. The 67×32-byte WOTS public key pk[66:0] is generated by hashing secret key sk across the 67 hash chains.

Figure 6A:
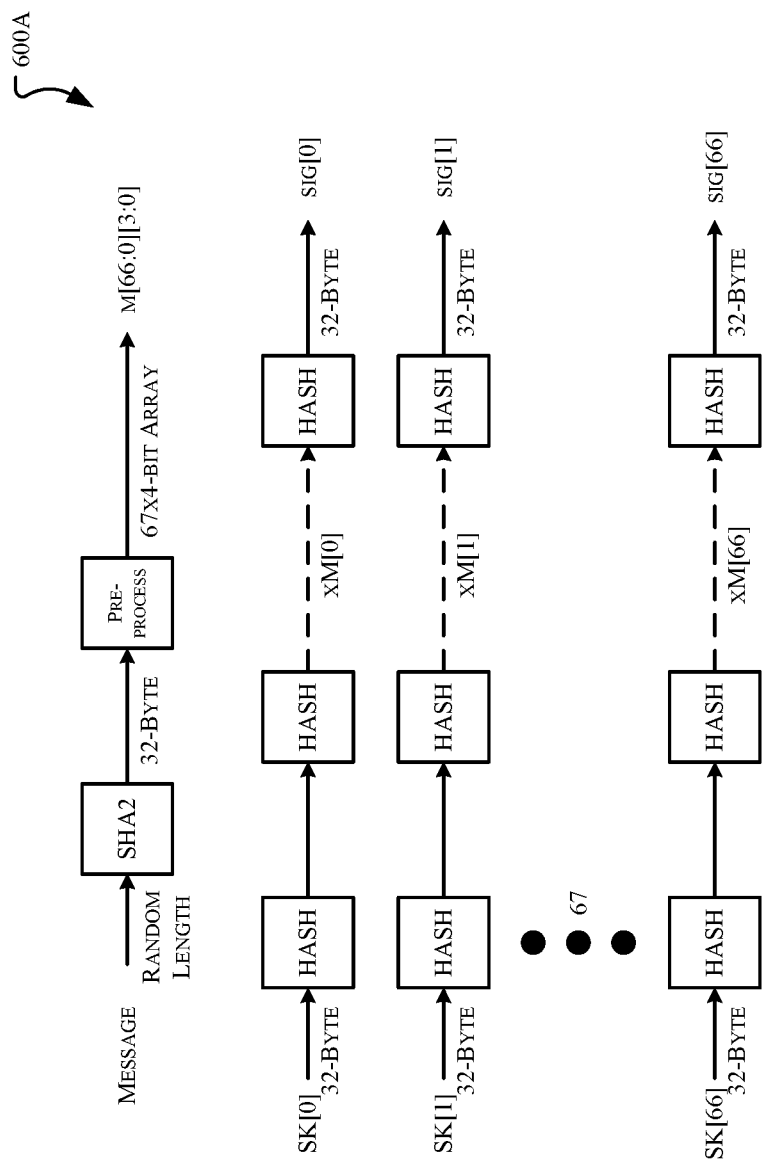
FIG. 6A is a schematic illustration of a compute blocks in an architecture to implement signature generation in a signature algorithm, in accordance with some examples.

FIG. 6A is a schematic illustration of a compute blocks in an architecture 600A to implement signature generation in a signature algorithm, in accordance with some examples. As illustrated in FIG. 6A, for message signing, the input message is hashed and pre-processed to compute a 67×4-bit value, which is used as an index to choose an intermediate hash value in each operation of the chain function.

Figure 6B:
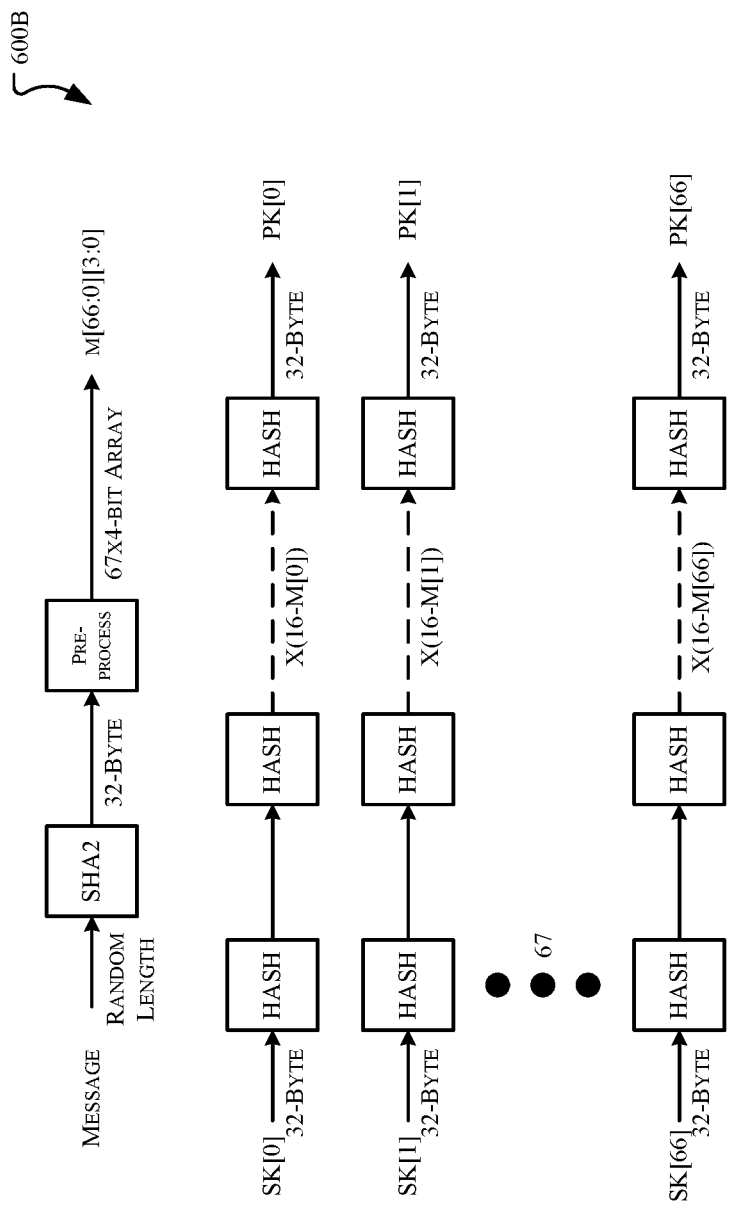
FIG. 6B is a schematic illustration of a compute blocks in an architecture to implement multi-time signature (MTS)-based mutual authenticate remote attestation, in accordance with some examples.

FIG. 6B is a schematic illustration of a compute blocks in an architecture 600B to implement signature verification in a verification algorithm, in accordance with some examples. Referring to FIG. 6B, during verification, the message is again hashed to compute the signature indices and compute the remaining HASH operations in each chain to compute the WOTS public key pk. This value and the authentication path are used to compute the root of the Merkle tree and compare with the shared public key PK to verify the message.

MTS-Based Mutual-Authenticated Remote Attestation

Remote attestation is a critical security component for many electronic devices. Remote attestation allows a platform to attest the authenticity and integrity of its hardware, firmware or software to a remote verifier (e.g., a manufacturer), which may need to obtain such guarantees before engaging in further processes. Common remote attestation mechanisms are either based on symmetric or asymmetric cryptography. Symmetric solutions are efficient but depend on pre-sharing a common cryptographic key and do not offer non-repudiation. Conventional asymmetric solutions, based on Elliptic Curve Cryptography (ECC) and RSA cryptosystems, such as TPM-based attestation, do not have this limitation but are very inefficient in terms of performance/power (not affordable for resource-constrained Internet-of-Things (IoT) devices), and as described above are vulnerable against quantum attacks, which is a concern for IoT devices as they may have longer lifespan (reaching the post-quantum era) than other devices. Hash-based signatures represent an alternative technique for attestation since they are asymmetric, efficient and resist quantum attacks.

Described herein are techniques to implement a MTS-based mutual-authenticated remote attestation scheme which utilizes a hash-based signature and thus is post-quantum secure. Further, the techniques are suitable for resource constrained IoT devices because the MTS-based scheme is highly efficient, particularly when the authentication path is updated offline (i.e., not required to be done during the attestation process but can be done afterwards). The techniques achieve mutual authentication between a prover device and a verifier device to reduce the risk of Denial-of-Service (DoS) as well as the risk of information leakage for the Prover.

The techniques described herein are intended to address a network adversary under a Dolev-Yao intruder model in which an active network adversary may take full control of all the communication channels. The adversary can eavesdrop on messages, modify them at will, inject its own message, delete messages, delay message delivery, duplicate any message and/or replay it later. Further, the adversary may be able to initiate new protocol sessions and interleave messages from different sessions. The model assumes that the verifier and the prover have secure storage for FIBS private keys, as described above with reference to FIG. 3. The attacker can only access and/or overwrite regular applications or the operating system, but not the non-volatile secure storage. The HBS private keys should be kept properly in the secure storage so that only legitimate user can read/update the HBS private keys. The adversary cannot modify the hardware circuitry.

Aspects of the embodiments are directed to remote attestation of a computing device. In the present context, attestation refers to the validation of the integrity of the computing device (e.g., including its software, firmware or hardware). The attestation operation described herein involves two parties: a prover (P), and a verifier (V). The prover is a computing entity that is to prove its current device integrity status to the verifier, while the verifier is a computing entity that needs to obtain attestation of the current device integrity status of the prover.

According to some embodiments, described herein, an efficient, asymmetric, post-quantum remote attestation protocol is based on hash-based signatures, which are sufficiently efficient (in terms of computational operations) to render the protocol suitable for use with resource-limited devices such as IoT devices. Any suitable hash-based signature scheme may be employed.

An attestation scheme involves the prover (e.g., an IoT device) and, optionally, the verifier, to perform hash-based, multi-time signature (MTS) operations. Examples of hash-based MTS include Merkle tree signatures, practical stateless hash-based signatures (SPHINCS), Extended Merkle (tree) signature scheme (XMSS), Leighton Micali signatures (LMS), or the like.

One example of an attestation protocol is based on the XMSS signature scheme. As described above, XMSS uses the WOTS+ one-time signature building block. WOTS+ is a one-time hash-based signature algorithm, and XMSS uses a Merkle tree to support signature verification multiple times with only one public key. In WOTS+, a random integer number is generated as private key (sk), and the public key (pk) is generated by calling a chain function that, among other things, applies a keyed hash function on sk for N times, where N is the maximum number of hashes that is allowed. Signing a message to generate a signature is done by calling this chain function for sk resulting in the application of the keyed hash function on it (N-M) times, assuming the message is an integer M. The verification process call this chain function again, providing the signature as input, resulting in the application of the keyed hash function (N-M) times. The signature is authentic if and only if the output of this process matches with the original public key pk.

As described above, XMSS uses a Merkle tree to derive one public key and a group of private keys so that multiple messages can be verified using just one public key. Each leaf node of the Merkle tree is a hashing of WOTS+ public key. Each of the rest of nodes is built by hashing and XORing its two children nodes. The root node should correspond to the group public key. To sign a message M, a node is first selected. Then in addition to the one-time signature schemed described above, the authentication path associated with this node (used to re-build the root node) is included as the final signature. The verification process first verifies the one-time signature using the node's public key. It then computes the root node based on the authentication path, which is compared against the known group public key. In this way, a multi-time signature scheme using a one-time signature is established.

The attestation protocols described herein can provide both classical security and post-quantum security, depending on the parameters chosen by the underlying HBS cryptography algorithms. Examples of parameter choices to offer 128-bit classical security and 128-bit post-quantum security are shown in table 1. Note that the parameters are selected to reduce latency at the cost of longer signatures.

TABLE 1

| Parameter | m | n | w | h |
|---|---|---|---|---|
| 128-bit classical security | 16 | 16 | 4 | 16 |
| 128-bit post-quantum security | 32 | 32 | 16 | 16 |

In some examples a mutual authentication scheme uses two pairs of multi-time FIBS keys to protect both the attestation request from the verifier to the prover and the attestation response from the prover to the verifier. It is assumed that the verifier and the prover have established a trusted relationship that is represented by two pairs of multi-time hash-based signature keys. The prover holds the public key $MTS_{PK1}$ and the private key $MTS_{SK2}$, while the verifier holds the MTS private key $MTS_{SK1}$ and a MTS public key $MTS_{PK2}$. The private keys are stored securely (e.g., in a trusted execution environment) and are not accessible by attackers. In addition, the prover and the verifier each have identifiers that can uniquely identify the respective devices. Further, the verifier and the prover are capable of handling multi-time FIBS operations, e.g., signing, verifying, and there is a communication channel between the devices.

Broadly, according to the protocol, the verifier sends an attestation request to the prover which includes a signature computed with $MTS_{SK1}$ to prove its authenticity. The prover first validates the request with $MTS_{PK1}$. If the request is legitimate, then the prover computes an attestation response using $MTS_{SK2}$ to sign the attestation proof. The verifier can use $MTS_{PK2}$ to verify the response from the prover.

Techniques described herein provide enhanced security including the verifier's authenticity, integrity and protecting against information leakage. The prover can identify whether the attestation request comes from a legitimate verifier by checking the verifier's signature and hence will not leak attestation information to irrelevant or malicious users. On the verifier side, as the attestation response is signed by the prover, the verifier can always assure that the attestation response comes from the correct prover without being tampered. To initiate an attestation, the verifier first computes a MTS signature, which provides additional protection against denial of service (DoS) attacks by malicious verifiers as the verifier needs to perform non-trivial tasks first.

Figure 7:
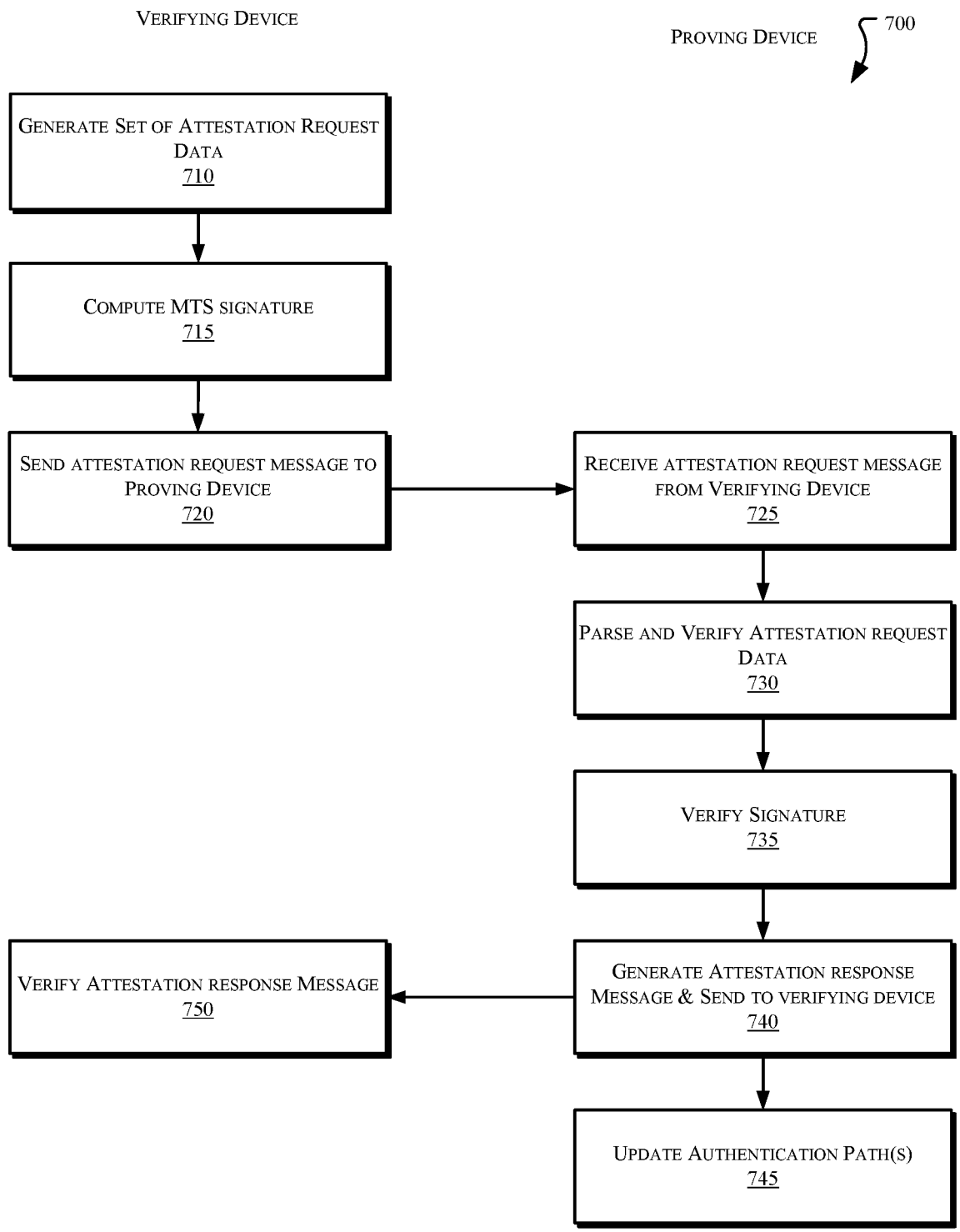
FIG. 7 is a flowchart illustrating operations in a method to implement parallel processing techniques for hash-based signature algorithms, in accordance with some examples.

FIG. 7 is a flowchart illustrating operations in a method to implement parallel processing techniques for hash-based signature algorithms, in accordance with some examples. In some examples the operations depicted in FIG. 7 may be implemented by the verifier device 310 and the prover device 350 depicted in FIG. 3. Table 2 provides a summary of some of the abbreviations and named parameters used in the operations illustrated in FIG. 7.

TABLE 2

| Notation | Definition |
| --- | --- |
| A→B: $m_i$ | Entity A sends entity B message $m_i$ |
| $id_V$, $id_P$ | Identifier of V and P respectively |
| N | Random nonce generated by V |
| $MTS_{PK}$ | Multi-time HBS public key |
| $MTS_{SK}$ | Multi-time HBS private key |
| $sig_M(\ldots)$ | Signature computed by private key M |
| rng | Random number generation |
| a, b | Attributes that specify what to be attested (e.g., address of region to be attested) |
| ‖ | Concatenation |
| α, β | Multi-time HBS signature |
| attest | Attestation response |

Referring to FIG. 7, at operation 710 a verifying device initiates a new protocol session by first generating a set of attestation request data. In some examples the attestation request data comprises a random (or pseudo-random) nonce (N) generated by the verifying device using a random number generator. The verifying device also determines the memory region it wants to attest by specifying the address bounds [a, b]. In other attestation examples, a and b can be other parameters that specify the attestation request. Then, at operation 715, to protect the integrity of the attestation request and provide the verifying device's authenticity guarantee, the verifier computes a hash-based MTS signature (α) by signing the set of data (N‖$id_V$‖$id_P$‖a‖b) with the multi-time FIBS private key $MTS_{SK1}$ (α=$Sign_{MTS_{SK1}}$(N‖$id_V$‖$id_P$‖a‖b). At operation 720 the verifier sends the attestation request message (including nonce N, verifier's identifier $id_V$, prover's identifier $id_P$, attestation parameters a and b, and the MTS signature α) to the prover.

These operations help to mitigate against a replay attack by using a random nonce, a message modification attack by using a multi-time hash-based signature, a misbinding attack by explicitly including Prover's identifier $id_P$.

At operation 725 the proving device receives the attestation request from the verifying device. At operation 730 the proving device verifies the attestation request data (i.e., N, idv, idp, a, b) received from the verifying device. At operation 735 the providing device verifies the signature (α) received from the verifying device using the public key $MTS_{PK1}$. At operation 740 the proving device generates an attestation response message by using its multi-time FIBS private key $MTS_{SK2}$ to sign the attestation result together with the session information (N‖$id_P$‖$id_V$‖a‖b‖attest) as β=$Sign_{MTS_{SK2}}$(N‖$id_P$‖$id_V$‖a‖b‖attest), and sends the attestation response message (including N, $id_P$, $id_V$ and β) to the verifying device. The signature β guarantees the integrity and authenticity of the attestation response message. After sending attestation reply message to the verifying device, the proving device may, at operation 745, update its local authentication path. This operation is not required to be completed immediately. Rather, it may be performed offline at a convenient time (e.g., before the next time using this multi-time HBS private key $MTS_{SK2}$).

These operations help to mitigate against a message modification attack by using a multi-time hash-based signature, a misbinding attack by explicitly including identifiers $id_P$ and $id_V$ and a spoofing attack.

After receiving the attestation response message from the proving device, at operation 750, the verifying device verifies the attestation result and the signature in the attestation response message. In some examples the verifying device verifies N, $id_P$, and $id_V$. The verifying device also guarantees the integrity and authenticity of the attestation response message with $MTS_{PK2}$. The output of the protocol is the attestation response protected by the signature β.

Figure 8:
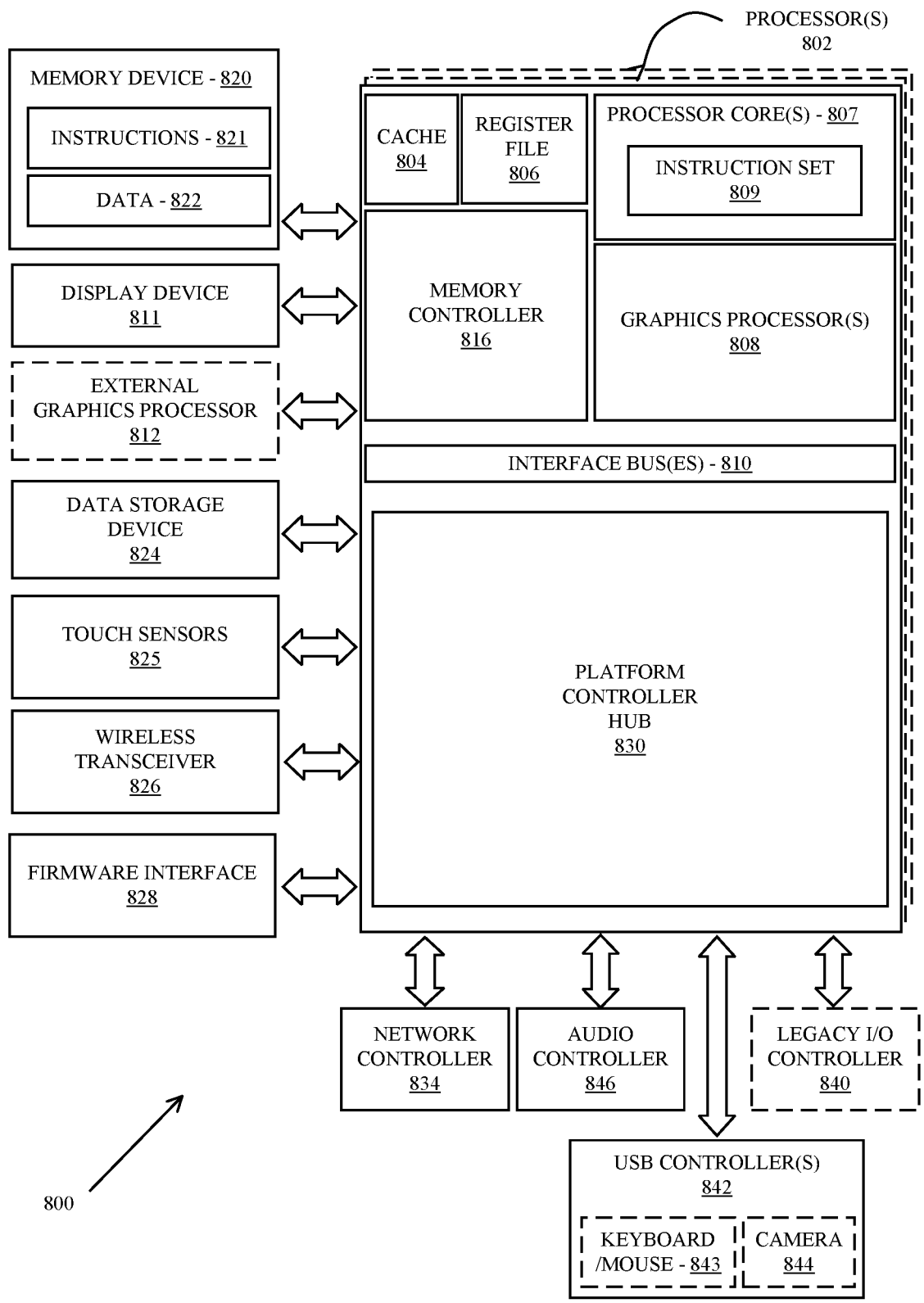
FIG. 8 is a schematic illustration of a computing architecture which may be adapted to implement multi-time signature (MTS)-based mutual authenticate remote attestation, in accordance with some examples.

FIG. 8 illustrates an embodiment of an exemplary computing architecture that may be suitable for implementing various embodiments as previously described. In various embodiments, the computing architecture 800 may comprise or be implemented as part of an electronic device. In some embodiments, the computing architecture 800 may be representative, for example of a computer system that implements one or more components of the operating environments described above. In some embodiments, computing architecture 800 may be representative of one or more portions or components of a DNN training system that implement one or more techniques described herein. The embodiments are not limited in this context.

As used in this application, the terms "system" and "component" and "module" are intended to refer to a computer-related entity, either hardware, a combination of hardware and software, software, or software in execution, examples of which are provided by the exemplary computing architecture 800. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 800 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 800.

As shown in FIG. 8, the computing architecture 800 includes one or more processors 802 and one or more graphics processors 808, and may be a single processor desktop system, a multiprocessor workstation system, or a server system having a large number of processors 802 or processor cores 807. In on embodiment, the system 800 is a processing platform incorporated within a system-on-a-chip (SoC or SOC) integrated circuit for use in mobile, handheld, or embedded devices.

An embodiment of system 800 can include, or be incorporated within a server-based gaming platform, a game console, including a game and media console, a mobile gaming console, a handheld game console, or an online game console. In some embodiments system 800 is a mobile phone, smart phone, tablet computing device or mobile Internet device. Data processing system 800 can also include, couple with, or be integrated within a wearable device, such as a smart watch wearable device, smart eyewear device, augmented reality device, or virtual reality device. In some embodiments, data processing system 800 is a television or set top box device having one or more processors 802 and a graphical interface generated by one or more graphics processors 808.

In some embodiments, the one or more processors 802 each include one or more processor cores 807 to process instructions which, when executed, perform operations for system and user software. In some embodiments, each of the one or more processor cores 807 is configured to process a specific instruction set 809. In some embodiments, instruction set 809 may facilitate Complex Instruction Set Computing (CISC), Reduced Instruction Set Computing (RISC), or computing via a Very Long Instruction Word (VLIW). Multiple processor cores 807 may each process a different instruction set 809, which may include instructions to facilitate the emulation of other instruction sets. Processor core 807 may also include other processing devices, such a Digital Signal Processor (DSP).

In some embodiments, the processor 802 includes cache memory 804. Depending on the architecture, the processor 802 can have a single internal cache or multiple levels of internal cache. In some embodiments, the cache memory is shared among various components of the processor 802. In some embodiments, the processor 802 also uses an external cache (e.g., a Level-3 (L3) cache or Last Level Cache (LLC)) (not shown), which may be shared among processor cores 807 using known cache coherency techniques. A register file 806 is additionally included in processor 802 which may include different types of registers for storing different types of data (e.g., integer registers, floating point registers, status registers, and an instruction pointer register). Some registers may be general-purpose registers, while other registers may be specific to the design of the processor 802.

In some embodiments, one or more processor(s) 802 are coupled with one or more interface bus(es) 810 to transmit communication signals such as address, data, or control signals between processor 802 and other components in the system. The interface bus 810, in one embodiment, can be a processor bus, such as a version of the Direct Media Interface (DMI) bus. However, processor busses are not limited to the DMI bus, and may include one or more Peripheral Component Interconnect buses (e.g., PCI, PCI Express), memory busses, or other types of interface busses. In one embodiment the processor(s) 802 include an integrated memory controller 816 and a platform controller hub 830. The memory controller 816 facilitates communication between a memory device and other components of the system 800, while the platform controller hub (PCH) 830 provides connections to I/O devices via a local I/O bus.

Memory device 820 can be a dynamic random-access memory (DRAM) device, a static random-access memory (SRAM) device, flash memory device, phase-change memory device, or some other memory device having suitable performance to serve as process memory. In one embodiment the memory device 820 can operate as system memory for the system 800, to store data 822 and instructions 821 for use when the one or more processors 802 executes an application or process. Memory controller hub 816 also couples with an optional external graphics processor 812, which may communicate with the one or more graphics processors 808 in processors 802 to perform graphics and media operations. In some embodiments a display device 811 can connect to the processor(s) 802. The display device 811 can be one or more of an internal display device, as in a mobile electronic device or a laptop device or an external display device attached via a display interface (e.g., DisplayPort, etc.). In one embodiment the display device 811 can be a head mounted display (HMD) such as a stereoscopic display device for use in virtual reality (VR) applications or augmented reality (AR) applications.

In some embodiments the platform controller hub 830 enables peripherals to connect to memory device 820 and processor 802 via a high-speed I/O bus. The I/O peripherals include, but are not limited to, an audio controller 846, a network controller 834, a firmware interface 828, a wireless transceiver 826, touch sensors 825, a data storage device 824 (e.g., hard disk drive, flash memory, etc.). The data storage device 824 can connect via a storage interface (e.g., SATA) or via a peripheral bus, such as a Peripheral Component Interconnect bus (e.g., PCI, PCI Express). The touch sensors 825 can include touch screen sensors, pressure sensors, or fingerprint sensors. The wireless transceiver 826 can be a Wi-Fi transceiver, a Bluetooth transceiver, or a mobile network transceiver such as a 3G, 4G, or Long Term Evolution (LTE) transceiver. The firmware interface 828 enables communication with system firmware, and can be, for example, a unified extensible firmware interface (UEFI). The network controller 834 can enable a network connection to a wired network. In some embodiments, a high-performance network controller (not shown) couples with the interface bus 810. The audio controller 846, in one embodiment, is a multi-channel high definition audio controller. In one embodiment the system 800 includes an optional legacy I/O controller 840 for coupling legacy (e.g., Personal System 2 (PS/2)) devices to the system. The platform controller hub 830 can also connect to one or more Universal Serial Bus (USB) controllers 842 connect input devices, such as keyboard and mouse 843 combinations, a camera 844, or other USB input devices.

The following pertains to further examples.

Example 1 is a prover device comprising one or more processors; a computer-readable memory; and signature logic to store two cryptographic representations of a trust relationship between the prover device and a verifier device, the two cryptographic representations based on two pairs of asymmetric hash-based multi-time signature keys; receive an attestation request message from the verifier device, the attestation request message comprising attestation request data for the prover device from the verifier device and a hash-based multi-time signature generated by the verifier device; and in response to the attestation request message, to verify the attestation request data; verify the hash-based multi-time signature generated by the verifier device using a public key associated with the verifier device; generate an attestation reply message using a hash-based multi-time private signature key; and send the attestation reply message to the verifier device.

In Example 2, the subject matter of Example 1 can optionally include an arrangement wherein the signature logic to update an authentication path through a multi-time signature tree structure.

In Example 3, the subject matter of any one of Examples 1-2 can optionally include an arrangement wherein the attestation request data for the verifier device comprises a nonce; a first identifier associated with the verifier device; a second identifier associated with the prover device; and one or more attributes that specify what is to be attested.

In Example 4, the subject matter of any one of Examples 1-3 can optionally include an arrangement wherein the signature logic to verify that the first identifier and the second identifier are not equal.

In Example 5, the subject matter of any one of Examples 1-4 can optionally include an arrangement wherein the signature logic to verify that the nonce is a fresh nonce.

In Example 6, the subject matter of any one of Examples 1-5 can optionally include an arrangement wherein the signature logic to verify that the one or more attributes specify a valid request for attestation.

In Example 7, the subject matter of any one of Examples 1-6 can optionally include an arrangement wherein the attestation reply message comprises a nonce; a first identifier associated with the verifier device; a second identifier associated with the prover device; and a hash-based multi-time signature.

Example 8 is a computer-implemented method, comprising storing, in a computer-readable memory of a prover device, two cryptographic representations of a trust relationship between the prover device and a verifier device, the two cryptographic representations based on two pairs of asymmetric hash-based multi-time signature keys; receiving, in the prover device, an attestation request message from the verifier device, the attestation request message comprising attestation request data for the prover device from the verifier device and a hash-based multi-time signature generated by the verifier device; and in response to the attestation request verifying the attestation request data; verifying the hash-based signature generated by the verifier device using a public key associated with the verifier device; generating an attestation reply message using a hash-based multi-time private signature key; and sending the attestation reply message to the verifier device.

In Example 9, the subject matter of any one of Examples 8 further comprising updating an authentication path through a multi-time signature tree structure.

In Example 10, the subject matter of any one of Examples 8-9 can optionally include, an arrangement wherein the attestation request data for the verifier device comprises a nonce; a first identifier associated with the verifier device; a second identifier associated with the prover device; and one or more attributes that specify what is to be attested.

In Example 11, the subject matter of any one of Examples 8-10 can optionally include verifying that the first identifier and the second identifier are not equal.

In Example 12, the subject matter of any one of Examples 8-11 can optionally include verifying that the nonce is a fresh nonce.

In Example 13, the subject matter of any one of Examples 8-12 can optionally include verifying that the one or more attributes specify a valid request for attestation.

In Example 14, the subject matter of any one of Examples 8-13 can optionally include an arrangement wherein the attestation reply message comprises a nonce; a first identifier associated with the verifier device; a second identifier associated with the prover device; and a hash-based multi-time signature.

Example 15 is a verifier device, comprising one or more processors; a computer-readable memory; and signature logic to generate a set of attestation request data for the prover device; generate an attestation request message comprising the set of attestation request data and a hash-based multi-time signature generated by the verifier device; and send the attestation request message to a prover device.

In Example 16, the subject matter Examples 16 can optionally include an arrangement wherein the attestation request data for the prover device comprises a nonce; a first identifier associated with the verifier device; a second identifier associated with the prover device; and one or more attributes that specify what is to be attested.

In Example 17, the subject matter of any one of Examples 15-16 can optionally include a communication interface to receive an attestation reply message from the prover device.

In Example 18, the subject matter of any one of Examples 15-17 can optionally include an arrangement wherein the attestation reply message comprises a nonce; a first identifier associated with the verifier device; a second identifier associated with the prover device; and a hash-based multi-time signature.

In Example 19, the subject matter of any one of Examples 15-18 can optionally include, the signature logic to verify the nonce, the first identifier, and the second identifier; and verify the hash-based multi-time signature using a public key associated with the prover device.

Example 20 is a computer-implemented method, comprising generating, in a verifier device, a set of attestation request data for the prover device; generating, in the verifier device, an attestation request message comprising the set of attestation request data and a hash-based multi-time signature generated by the verifier device; and sending the attestation request message to a prover device.

In Example 21, the subject matter of any one of Example 20 can optionally include an arrangement wherein the attestation request data for the prover device comprises a nonce; a first identifier associated with the verifier device; a second identifier associated with the prover device; and one or more attributes that specify what is to be attested.

In Example 22, the subject matter of any one of Examples 20-21 can optionally include a communication interface to receive an attestation reply message from the prover device.

In Example 23, the subject matter of any one of Examples 20-22 can optionally include an arrangement wherein the attestation reply message comprises a nonce; a first identifier associated with the verifier device; a second identifier associated with the prover device; and a hash-based multi-time signature.

In Example 24, the subject matter of any one of Examples 20-23 can optionally include verifying the nonce, the first identifier, and the second identifier; and verifying the hash-based multi-time signature using a public key associated with the prover device.

The above Detailed Description includes references to the accompanying drawings, which form a part of the Detailed Description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In addition "a set of" includes one or more elements. In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim are still deemed to fall within the scope of that claim. Moreover, in the following claims, the terms "first," "second," "third," etc. are used merely as labels, and are not intended to suggest a numerical order for their objects.

The terms "logic instructions" as referred to herein relates to expressions which may be understood by one or more machines for performing one or more logical operations. For example, logic instructions may comprise instructions which are interpretable by a processor compiler for executing one or more operations on one or more data objects. However, this is merely an example of machine-readable instructions and examples are not limited in this respect.

The terms "computer readable medium" as referred to herein relates to media capable of maintaining expressions which are perceivable by one or more machines. For example, a computer readable medium may comprise one or more storage devices for storing computer readable instructions or data. Such storage devices may comprise storage media such as, for example, optical, magnetic or semiconductor storage media. However, this is merely an example of a computer readable medium and examples are not limited in this respect.

The term "logic" as referred to herein relates to structure for performing one or more logical operations. For example, logic may comprise circuitry which provides one or more output signals based upon one or more input signals. Such circuitry may comprise a finite state machine which receives a digital input and provides a digital output, or circuitry which provides one or more analog output signals in response to one or more analog input signals. Such circuitry may be provided in an application specific integrated circuit (ASIC) or field programmable gate array (FPGA). Also, logic may comprise machine-readable instructions stored in a memory in combination with processing circuitry to execute such machine-readable instructions. However, these are merely examples of structures which may provide logic and examples are not limited in this respect.

Some of the methods described herein may be embodied as logic instructions on a computer-readable medium. When executed on a processor, the logic instructions cause a processor to be programmed as a special-purpose machine that implements the described methods. The processor, when configured by the logic instructions to execute the methods described herein, constitutes structure for performing the described methods. Alternatively, the methods described herein may be reduced to logic on, e.g., a field programmable gate array (FPGA), an application specific integrated circuit (ASIC) or the like.

In the description and claims, the terms coupled and connected, along with their derivatives, may be used. In particular examples, connected may be used to indicate that two or more elements are in direct physical or electrical contact with each other. Coupled may mean that two or more elements are in direct physical or electrical contact. However, coupled may also mean that two or more elements may not be in direct contact with each other, but yet may still cooperate or interact with each other.

Reference in the specification to "one example" or "some examples" means that a particular feature, structure, or characteristic described in connection with the example is included in at least an implementation. The appearances of the phrase "in one example" in various places in the specification may or may not be all referring to the same example.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with each claim standing on its own as a separate embodiment. The scope of the embodiments disclosed herein is to be determined with reference to the appended claims, along with the full scope of equivalents to which such claims are entitled.

Although examples have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. A prover device, comprising:
    one or more processors;
    a computer-readable memory;
    signature logic to:
        store two cryptographic representations of a trust relationship between the prover device and a verifier device, the two cryptographic representations based on two pairs of asymmetric hash-based multi-time signature keys;
        receive an attestation request message from the verifier device, the attestation request message comprising attestation request data and a memory address for the prover device from the verifier device and a hash-based multi-time signature generated by the verifier device; and
        in response to the attestation request message, to:
            verify the attestation request data;
            validate the memory address for the prover device;
            verify the hash-based multi-time signature generated by the verifier device using a public key associated with the verifier device;
            generate an attestation reply message using a hash-based multi-time private signature key; and
            send the attestation reply message to the verifier device.

2. The prover device of claim 1, the signature logic to:
    update an authentication path through a multi-time signature tree structure.

3. The prover device of claim 1, wherein the attestation request data for the verifier device comprises:
    a nonce;
    a first identifier associated with the verifier device;

a second identifier associated with the prover device; and
one or more attributes that specify what is to be attested.

4. The prover device of claim 3, the signature logic to:
verify that the first identifier and the second identifier are not equal.

5. The prover device of claim 3, the signature logic to:
verify that the nonce is a fresh nonce.

6. The prover device of claim 5, the signature logic to:
verify that the one or more attributes specify a valid request for attestation.

7. The prover device of claim 1, wherein the attestation reply message comprises:
a nonce;
a first identifier associated with the verifier device;
a second identifier associated with the prover device; and
a hash-based multi-time signature.

8. A computer-implemented method, comprising:
storing, in a computer-readable memory of a prover device, two cryptographic representations of a trust relationship between the prover device and a verifier device, the two cryptographic representations based on two pairs of asymmetric hash-based multi-time signature keys;
receiving, in the prover device, an attestation request message from the verifier device, the attestation request message comprising attestation request data and a memory address for the prover device from the verifier device and a hash-based multi-time signature generated by the verifier device; and
in response to the attestation request:
verifying the attestation request data;
validating the memory address for the prover device;
verifying the hash-based signature generated by the verifier device using a public key associated with the verifier device;
generating an attestation reply message using a hash-based multi-time private signature key; and
sending the attestation reply message to the verifier device.

9. The method of claim 8, further comprising:
updating an authentication path through a multi-time signature tree structure.

10. The method of claim 9, wherein the attestation request data for the verifier device comprises:
a nonce;
a first identifier associated with the verifier device;
a second identifier associated with the prover device; and
one or more attributes that specify what is to be attested.

11. The method of claim 10, further comprising:
verifying that the first identifier and the second identifier are not equal.

12. The method of claim 10, further comprising:
verifying that the nonce is a fresh nonce.

13. The method of claim 10, further comprising:
verifying that the one or more attributes specify a valid request for attestation.

14. The method of claim 12, wherein the attestation reply message comprises:
a nonce;
a first identifier associated with the verifier device;
a second identifier associated with the prover device; and
a hash-based multi-time signature.

15. A verifier device, comprising:
one or more processors;
a computer-readable memory;
signature logic to:
generate a set of attestation request data and a memory address for the a prover device;
generate an attestation request message comprising the set of attestation data request, the memory address, and a hash-based multi-time signature generated by the verifier device; and
send the attestation request message to a prover device.

16. The verifier device of claim 15, wherein the attestation request data for the prover device comprises:
a nonce;
a first identifier associated with the verifier device;
a second identifier associated with the prover device; and
one or more attributes that specify what is to be attested.

17. The verifier device of claim 15, further comprising a communication interface to receive an attestation reply message from the prover device.

18. The verifier device of claim 17, wherein the attestation reply message comprises:
a nonce;
a first identifier associated with the verifier device;
a second identifier associated with the prover device; and
a hash-based multi-time signature.

19. The verifier device of claim 18, the signature logic to:
verify the nonce, the first identifier, and the second identifier; and
verify the hash-based multi-time signature using a public key associated with the prover device.

20. A computer-implemented method, comprising:
generating, in a verifier device, a set of attestation request data and a memory address for a prover device;
generating, in the verifier device, an attestation request message comprising the set of attestation request data, the memory address, and a hash-based multi-time signature generated by the verifier device; and
sending the attestation request message to a prover device.

21. The computer-implemented method of claim 20, wherein the attestation request data for the prover device comprises:
a nonce;
a first identifier associated with the verifier device;
a second identifier associated with the prover device; and
one or more attributes that specify what is to be attested.

22. The computer-implemented method of claim 20, further comprising a communication interface to receive an attestation reply message from the prover device.

23. The computer-implemented method of claim 22, wherein the attestation reply message comprises:
a nonce;
a first identifier associated with the verifier device;
a second identifier associated with the prover device; and
a hash-based multi-time signature.

24. The computer-implemented method of claim 23, further comprising:
verifying the nonce, the first identifier, and the second identifier; and
verifying the hash-based multi-time signature using a public key associated with the prover device.

* * * * *